United States Patent
Ahn et al.

(10) Patent No.: US 6,774,523 B2
(45) Date of Patent: Aug. 10, 2004

(54) ELECTRIC MOTOR

(75) Inventors: Jun-Ho Ahn, Seoul (KR); Kwan-Yuhl Cho, Seoul (KR); Hyoun-Jeong Shin, Incheon (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/412,341

(22) Filed: Apr. 14, 2003

(65) Prior Publication Data

US 2004/0080228 A1 Apr. 29, 2004

(30) Foreign Application Priority Data

Oct. 26, 2002 (KR) .................................. 10-2002-0065690

(51) Int. Cl.$^7$ ............................. H02K 1/00; H02K 1/22; H02K 21/12
(52) U.S. Cl. ................. 310/216; 310/40 R; 310/156.53; 310/156.01; 310/261
(58) Field of Search ............................. 310/216, 40 R, 310/156.53, 156.01, 261

(56) References Cited

U.S. PATENT DOCUMENTS

| | | | | |
|---|---|---|---|---|
| 6,049,153 A | * | 4/2000 | Nishiyama et al. | .... 310/156.53 |
| 6,369,480 B1 | * | 4/2002 | Nishiyama et al. | .... 310/156.53 |
| 6,582,207 B2 | * | 6/2003 | Matsumoto et al. | ...... 417/410.1 |

* cited by examiner

*Primary Examiner*—Dang Le
*Assistant Examiner*—Heba Elkassabgi
(74) *Attorney, Agent, or Firm*—Birch, Stewart, Kolasch & Birch, LLP

(57) ABSTRACT

An electric motor, more particularly, a rotor structure of an electric motor comprises: a stator including a plurality of teeth and coil wound on the teeth to form rotary magnetic flux by applied electric source; a rotary shaft; and a rotor rotatably installed in the stator, the rotor including a shaft insertion hole so that the rotary shaft can be inserted therethrough and fixed, wherein the rotor includes a plurality of permanent magnet insertion slots of 'V' or 'U' shape formed in radial direction as centering around the shaft insertion hole, and permanent magnets are inserted and fixed into the permanent magnet insertion slots respectively, and a plurality of air gap expanding portions, on which air gaps from the teeth of the stator are expanded, are formed on an outer circumferential surface of the rotor.

14 Claims, 5 Drawing Sheets

ELECTRIC MOTOR

BACKGROUND OF THE INVENTION

1. Field of the Invention

The present invention relates to an electric motor, and particularly, to a rotor structure of an electric motor.

2. Description of the Background Art

Generally, a brushless direct current (BLDC) motor is made by removing a brush and a commutator from a direct current motor and by installing an electric rectifying device not to generate mechanical and electrical noise. Therefore, motor having various speed from low to high can be fabricated, and a motor having stable rotation torque and long life span with multiple poles can be made.

FIG. 1 is a longitudinal cross-sectional view showing a conventional BLDC motor, FIG. 2 is a cross-sectional view showing in line II—II, and FIG. 3 is a brief view showing distribution of magnetic flux density of the motor shown in FIG. 1.

As shown in FIG. 1, the conventional BLDC motor includes a housing body 11 having inner space; a housing 10 having a cover portion 12 for covering an opening portion of the housing body 11 and bearings 13 and 14 installed on center portions thereof; a stator 20 fixedly installed in the housing 10; a rotor 30 rotatably inserted into the stator 20; and a rotary shaft 40 fixedly pressed into the rotor 30 and rotatably inserted into the respective bearings 13, 14 in order to transmit the rotation force of the rotor 30 to outer part.

As shown in FIG. 2, the stator 20 includes a stator core 26 including a plurality of teeth 21 protrudingly formed on an inner circumferential surface thereof, slots 22 formed between the respective teeth 21, and slot opening portions 23 formed between tips 25 which are protrudingly formed on ends of the teeth 21; and a coil 24 wound on the teeth 21 of the stator core 26.

The rotor 30 includes a shaft insertion hole 31, through which the rotary shaft 40 is fixedly press-fitted, on a center portion thereof. In addition, rotor cores 36 on which four magnet insertion slots 32 of 'V' shape for fixing two permanent magnets which are symmetric for magnetic center respectively are formed as centering around the rotary shaft 40 in a radial direction are laminated and coupled by a rivet through the rivet hole 35 so that two magnetic centers cross each other in right angle on outer side of the shaft insertion hole 31.

The permanent magnets 33 are inserted into ends of the magnet insertion slots 32 in pairs to have equal polarity, and installed to have polarity opposite to that of another permanent magnet 33 inserted into adjacent magnet insertion slot 32.

A recess 34 is formed around the end of the magnet insertion slot 32 in radial direction in order to disperse the magnetic flux density of the permanent magnet 33.

In the conventional BLDC motor having above structure, when electric source is applied sequentially on the coil 24 wound on respective teeth 21 of the stator 20 by an electric source applying circuit (not shown), the respective teeth 21 have alternating polarity of N and S poles, and the rotor 30 is rotated by magnetic flux between the teeth 21 and the permanent magnet 33 of the rotor 30 which is adjacent to the teeth of the stator 20.

At that time, interaction between the two permanent magnets 33 inserted in the magnet insertion slots 32 formed on the rotor 30 to have same polarity on both ends thereof and the teeth adjacent thereto will be described in more detail with reference to FIG. 3.

When the end of the permanent magnet 33 having N polar direction and a tooth 21 having same polar direction, that is, N polar direction, are adjacent to each other on the end of the magnet insertion slot 32, and magnetic forces are repulsed and repulsive force for pushing each other is generated. In addition, when the end of the permanent magnet 33 having N polar direction and a tooth 21 having opposite polar direction, that is, S polar direction, are adjacent to each other, active magnetic flux (a) is formed and magnetic flux density (b) is concentrated to generate attractive force.

The polarity of the teeth 31 can be changed by the electric source flowing on the coil 24 which is wound on the stator core 26, and according to the changes, is the repulsive force or the attractive force is applied with the adjacent permanent magnets 33. In addition, when the repulsive or attractive force is applied toward the tangent direction of the rotor core 36, the rotor 30 can be rotated smoothly.

However, on a tip portion of the tooth 21 having polar direction opposite to that of the permanent magnet 33 on the end of the magnet insertion slot 32, the magnetic flux is concentrated and peak flux (c) is generated, and shock force toward radial direction which interrupts the rotation of the rotor 30 is generated.

In addition, the shock force in radial direction generated due to the magnetic flux increase on the tip 25 of the tooth 21 generates vibration when the rotor 30 is rotated, and accordingly, noise due to the vibration is also generated.

SUMMARY OF THE INVENTION

Therefore, an object of the present invention is to provide an electric motor having less vibration and noise by restricting generation of shock force generated around a rotor and teeth of a stator.

To achieve the object of the present invention, as embodied and broadly described herein, there is provided an electric motor comprising: a stator including a plurality of teeth and a coil unit wound on the teeth to form rotating magnetic flux by applied electric source; a rotary shaft; and a rotor rotatably installed in the stator, the rotor including a shaft insertion hole so that the rotary shaft can be inserted therethrough and fixed, wherein the rotor includes a plurality of permanent magnet insertion slots of 'V' shape formed as centering around the shaft insertion hole in radial direction, and permanent magnets are inserted and fixed into the permanent magnet insertion slots respectively, and a plurality of air gap expanding portions, on which air gaps from the teeth of the stator are expanded, are formed on an outer circumferential surface of the rotor.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 1:
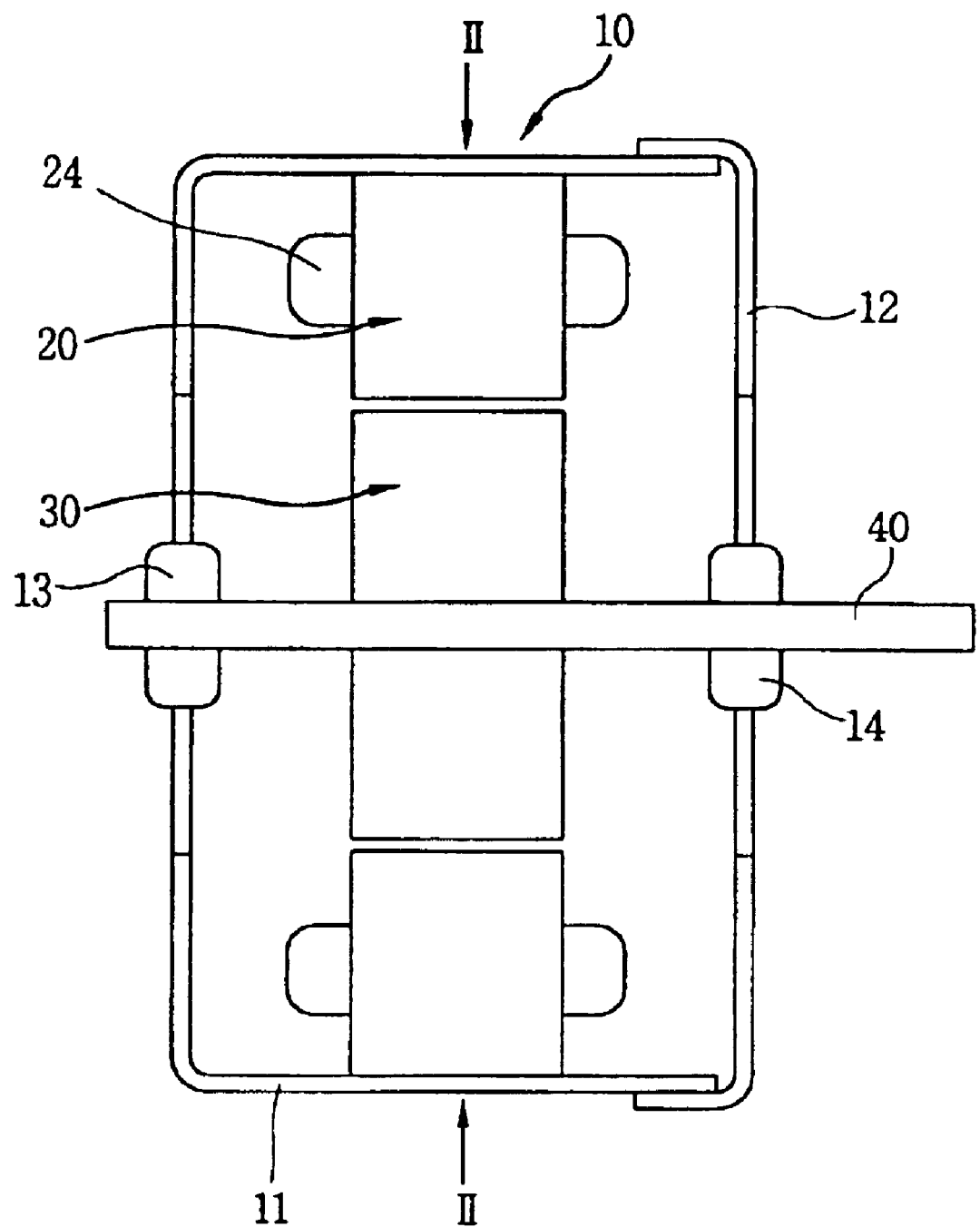
FIG. 1 is a longitudinal cross-sectional view showing a conventional BLDC motor.
Figure 2:
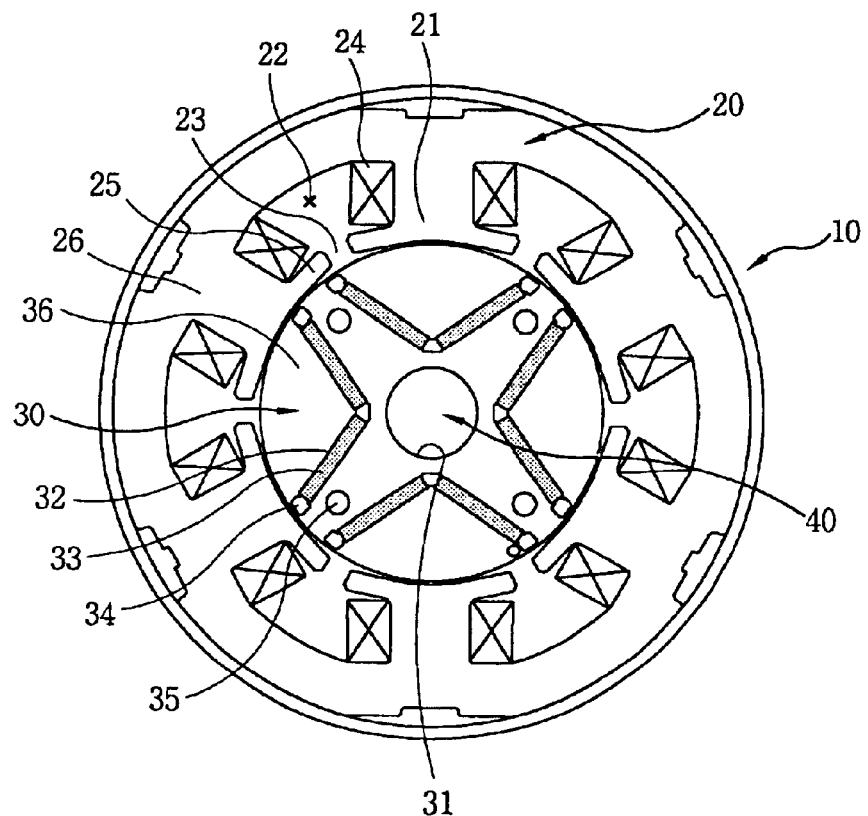
FIG. 2 is a cross-sectional view in line II—II direction shown in FIG. 1.
Figure 3:
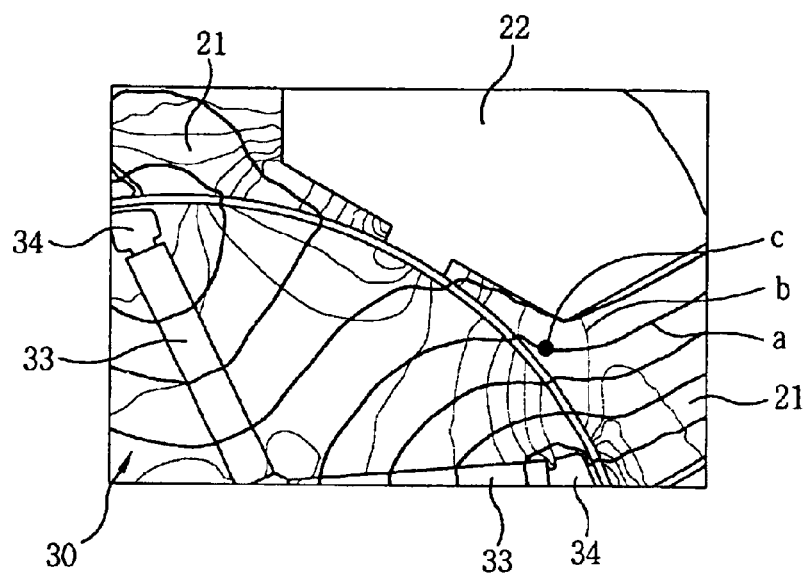
FIG. 3 is a diagram showing distribution of magnetic flux density of the motor shown in FIG. 1.

Reference will now be made in detail to the preferred embodiments of the present invention, examples of which are illustrated in the accompanying drawings. For same components as those of the conventional art, same reference numerals are used for convenience' sake.

Figure 4:
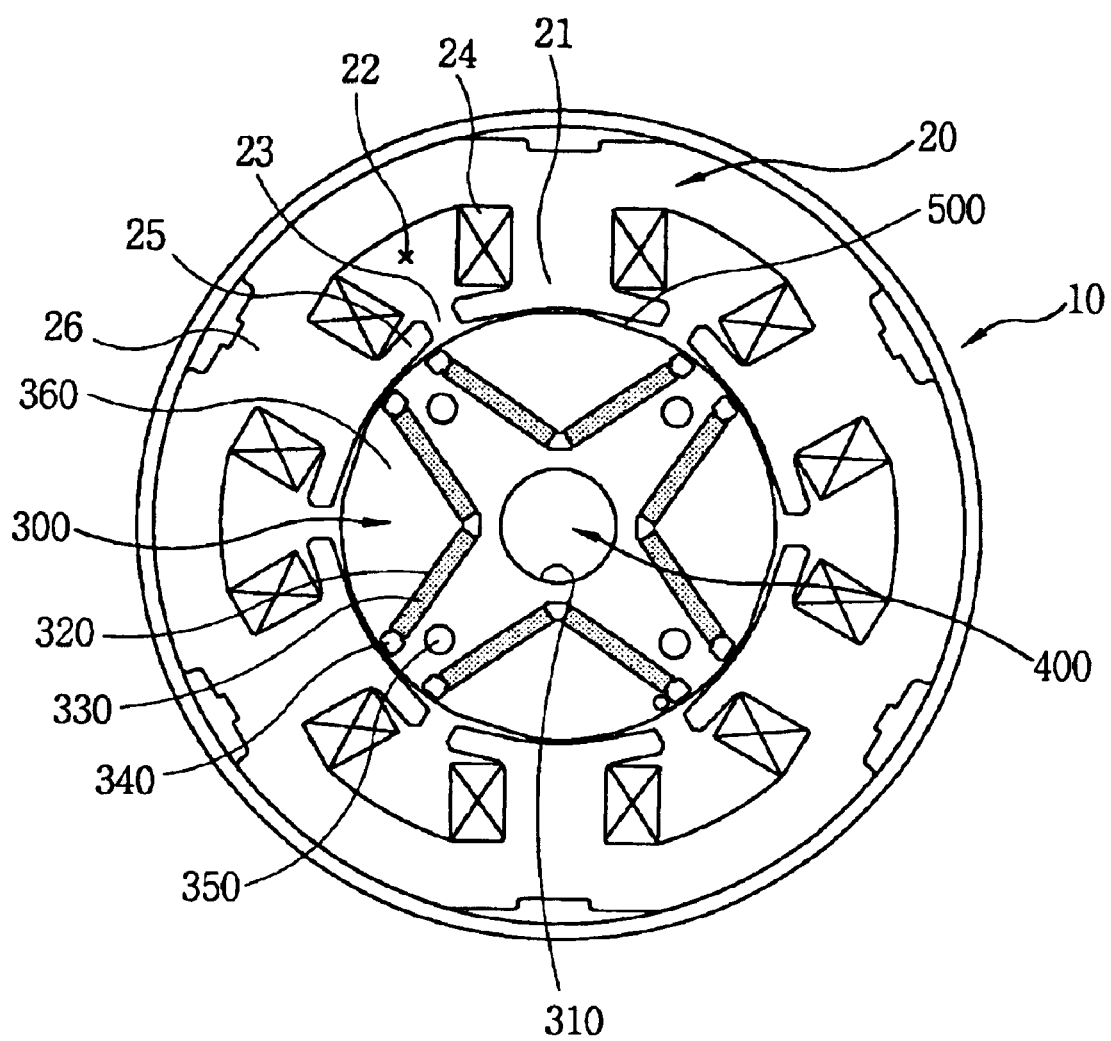
FIG. 4 is a cross-sectional view showing an electric motor according to the present invention.
Figure 5:
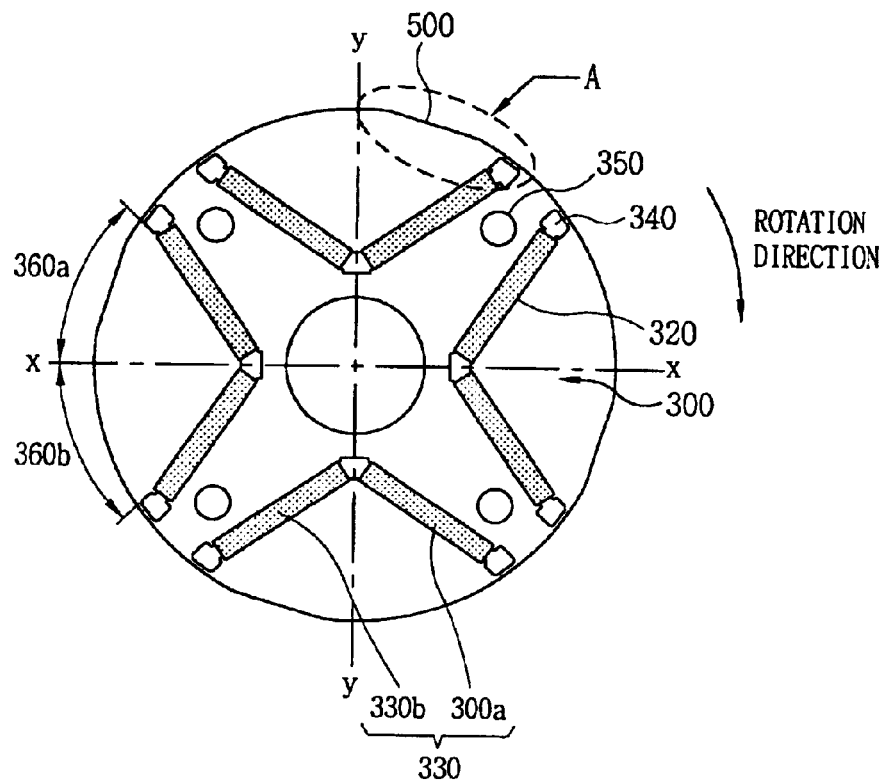
FIG. 5 is a geometrical view showing a core of a rotor in the electric motor shown in FIG. 4.
Figure 6:
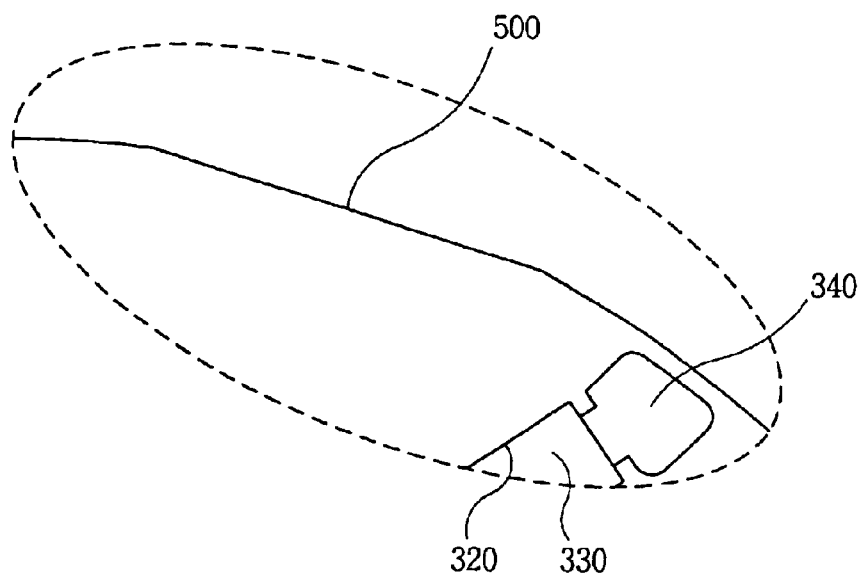
FIG. 6 is an enlarged view showing A part of FIG. 5.

FIG. 4 is a cross-sectional view showing an electric motor according to the present invention, FIG. 5 is a geometrical view showing a core of a rotor in the electric motor shown in FIG. 4, and FIG. 6 is an enlarged view showing A part of FIG. 5.

As shown therein, an electric motor according to the present invention includes: a stator 20 including a plurality of teeth 21 and coils 24 wound on the teeth 21 to form rotating magnetic flux by applied electric source; a rotary shaft 400; and a rotor 300, which is rotatably installed in the stator 20, including a shaft insertion hole 310 so that the rotary shaft 400 can be inserted and fixed therein.

The electric motor of the present invention includes a housing 10, on which the stator 20 is fixedly installed, having a rotary shaft supporting portion in which the rotary shaft 400 is rotatably fitted.

In addition, the housing 10 includes an opening portion on one side thereof, and includes a cover portion 12 covering the opening portion and including a rotary shaft supporting portion through which one side of the rotary shaft 400 is rotatably fitted.

The rotary shaft supporting portion can be embodied in various types, however, bearings 13 and 14 are usually used as the rotary shaft supporting portion. The rotary shaft 400 transmits rotational force generated by an interaction between the stator 20 and the rotor 300 to outer side.

The electric motor according to the present invention is generally a BLDC motor, and the coil 24 is wound on the teeth 21 of the stator 20 in a concentrated winding method.

The rotor 300 includes a plurality of permanent magnet insertion slots 320 formed in a radial direction of the rotary shaft 400 centering around the shaft insertion hole 310, and permanent magnets 330 are inserted and fixed in the permanent magnet insertion slots 320 respectively. In addition, a plurality of air gap expanding portions 500, on which air gaps from the teeth 21 of the stator 20 are expanded, are formed on an outer circumferential surface of the rotor 300.

The stator 20 comprises: a stator core 26 including a plurality of teeth 21 protrudingly formed on an inner circumferential surface thereof, slots 22 formed between the respective teeth 21, and a slot opening portion 23 formed between tips 25 which are protrudingly formed from both sides of the ends of the teeth 21; and coil 24 intensively (concentratedly) wound on the teeth 21 of the stator core 26.

As shown in FIG. 5, the rotor 300 is made by laminating rotor cores 360 which include respectively: a shaft insertion hole 310 for press-fitting and fixing the rotary shaft 400 formed on a center portion thereof; and four permanent magnet insertion slots 330 of 'V' or 'U' shape, in which permanent magnets 320 are inserted is formed on outer side of the shaft insertion hole 310 in a circumferential direction of the rotary shaft 400, and are respectively symmetrical for two center lines of magnetic poles (x—x, y—y) which cross each other in right angles. The rotor is cores 360 are fixedly coupled by a rivet, etc. through a rivet hole 350.

The permanent magnets 330 are in pairs, and the pairs of permanent magnets are respectively inserted into the permanent magnet insertion slots 320, and the ends of each pair of permanent magnets in the ends of each slot 320 have same polar directions (N or S) and polar directions opposite to those of the adjacent pair of permanent magnet 330 inserted into slot 320 adjacent thereto.

In addition, four permanent magnet insertion slots 320 are disposed in the embodiment of the present invention, however, the number of slots 320 can be decided according to required function.

Also, the permanent magnet insertion slots 320 are disposed in a radial direction centering around the rotary shaft 400, and especially, the slots are formed to be symmetrical for each other centering around an extended line in the radial direction of the rotary shaft 400 (x or y) from the rotary shaft 400.

In addition, recesses 340 are formed around the ends of each permanent magnet insertion slot 320 in a radial direction in order to disperse the magnetic flux density of the permanent magnet 330.

As shown in FIGS. 5 and 6, the air gap expanding portions 500 are formed on the outer circumferential surface of the core located between the both ends of each permanent magnet insertion slot 320 to be closer to the end of the slot located on rotational direction of the rotor 300 (clockwise direction in FIG. 5).

In addition, the air gap expanding portions 500 are formed by cutting some part of the rotor 300, that is, the circumferential surface of the rotor core 360 as straight line shape.

Especially, as shown in FIG. 5, the air gap expanding portions 500 are respectively formed near the permanent magnet 330b, which is located on the rotational direction, between the two permanent magnets 330a and 330b constructing the permanent magnet 330, and more desirably, the air gap expanding portions 500 are located on a half side 360b on the rotational direction of the rotary shaft 400 when the circumferential surface of the rotor 300 between the both ends of the magnet member insertion slot 320 is divided into halves 360a and 360b.

Operations and effects of the electric motor having above construction according to the present invention will be described as follows.

When the electric source is applied sequentially to the coil wound on the respective teeth 21 of the stator 20 by an electric source applying circuit (not shown), the respective teeth 21 have polarities of N and S poles alternatively. And accordingly, the rotor 300 is rotated by the magnetic flux between the teeth 21 of the stator 20 and the permanent magnet 330 of the rotor 300 adjacent to the teeth 21.

In case that the end of the permanent magnet 330 having polar direction opposite to that of the teeth 21 of the stator 20 is adjacent to the circumferential surface of the fixed rotor 300, the magnetic flux of the permanent magnet 330 is generated actively, and therefore, the magnetic flux density is concentrated on a tip 25 of the teeth 21. At that time, the air gap expanding portion 500 which expands the air gap by cutting some of the outer circumferential surface of the rotor 300 corresponding to the tip 25 of the teeth 21 is formed to reduce the shock force of the rotor 300 toward the radial direction due to the generation of peak flux.

Figure 7:
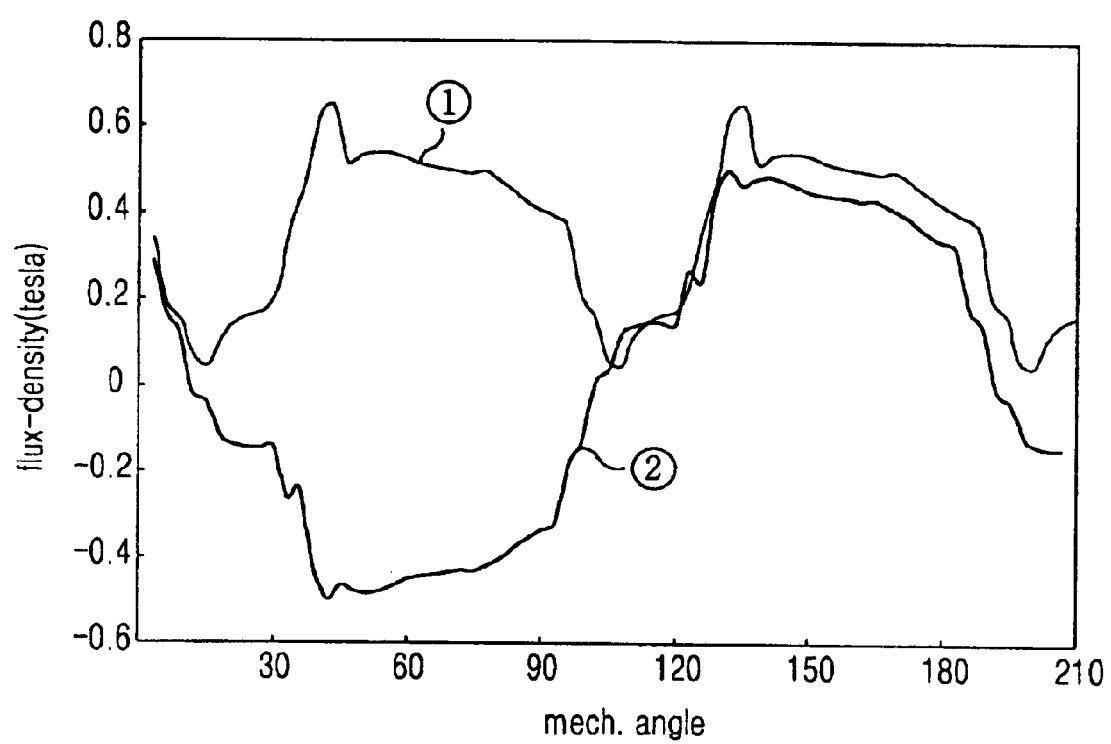
FIG. 7 is a graph comparing magnetic fluxes of the electric motor is according to the present invention and of the conventional electric motor.

FIG. 7 is a graph comparing distributions of magnetic flux density on the electric motor of the present invention and the conventional electric motor. As shown therein, according to the electric motor having a plurality of air gap expanding portions 500 on outer circumferential surface of the rotor 300 of the present invention, the peak flux is reduced and wavelength is similar to the sine wave in the magnetic flux density ② of the present invention around the air gap of the teeth 21 of the stator 20 according to the rotating angle of the rotor 300 when comparing them to the magnetic flux density ① of the conventional electric motor.

Therefore, the shock force in radial direction of the rotor due to the peak flux according to the concentration of magnetic flux density is reduced, and accordingly, the vibration and vibration noise generated when the rotor is operated can be reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An electric motor comprising:
    a stator including a plurality of teeth and coil wound on the teeth to form rotary magnetic flux by applied electric source;
    a rotary shaft; and
    a rotor rotatably installed in the stator, the rotor including a shaft insertion hole so that the rotary shaft can be inserted therethrough and fixed,
    wherein, the rotor includes a plurality of permanent magnet insertion slots of 'V' shape or 'U' shape formed in radial direction as centering around the shaft insertion hole, and permanent magnets are inserted and fixed into the permanent magnet insertion slots respectively, and a plurality of air gap expanding portions are formed on an outer circumferential surface of the rotor, wherein the air gap expanding portions are formed on an outer circumferential surface of the rotor located between both ends of each permanent magnet insertion slot to be closer to the end of the permanent magnet insertion slot in the rotating direction of the rotor and wherein the air gap expanding portions are made by cutting a part of the outer circumferential surface of the rotor as straight line shape.

2. The motor of claim 1, wherein the motor is a brushless direct current motor.

3. The motor of claim 1, wherein the coil is wound on the teeth in a concentrated winding method.

4. The motor of claim 1, wherein the coil is wound on the teeth in a concentrated winding method.

5. The motor of claim 1, wherein the permanent magnet insertion slot is symmetrical shape centering around an extended line in a radial direction of the rotary shaft from the rotary shaft.

6. The motor of claim 1, wherein the rotor is formed by laminating a plurality of cores.

7. The motor of claim 1, wherein the permanent magnets are in pairs, and each pair of permanent magnets are respectively inserted into the permanent magnet insertion slot so that both ends of the permanent magnet insertion slot have same polarity.

8. The motor of claim 1, wherein the permanent magnets are inserted into the permanent magnet insertion slots so that the ends of the permanent magnet insertion slot have polarity opposite to those of the ends of the adjacent permanent magnet insertion slot.

9. The motor of claim 1, comprising a housing including the stator fixedly installed therein, and a rotary shaft supporting portion into which the rotary shaft is rotatably fitted.

10. The motor of claim 1, wherein the permanent magnet insertion slot is formed to be symmetrical centering around an extended line in a radial direction of the rotary shaft from the rotary shaft.

11. The motor of claim 1, wherein the rotor is formed by laminating a plurality of cores.

12. The motor of claim 1, wherein the permanent magnets are in pairs, and each pair of permanent magnets are inserted into the permanent magnet insertion slot so that both ends of the permanent magnet insertion slot have same polarity.

13. The motor of claim 1, wherein the permanent magnets are inserted into the permanent magnet insertion slots so that the ends of the permanent magnet insertion slots have polarity opposite to those of the ends of the adjacent permanent magnet insertion slot.

14. The motor of claim 1, comprising a housing including the stator fixedly installed thereon, and a rotary shaft supporting portion into which the rotary shaft is rotatably fitted.

* * * * *